United States Patent
Yokoyama et al.

(10) Patent No.: US 7,728,479 B2
(45) Date of Patent: Jun. 1, 2010

(54) DC-MOTOR

(75) Inventors: Masayuki Yokoyama, Tokyo (JP); Youichi Fujita, Tokyo (JP); Sotsuo Miyoshi, Tokyo (JP); Naohiro Oketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 152 days.

(21) Appl. No.: 11/989,462

(22) PCT Filed: Nov. 30, 2006

(86) PCT No.: PCT/JP2006/323901
§ 371 (c)(1), (2), (4) Date: Jan. 25, 2008

(87) PCT Pub. No.: WO2007/122767
PCT Pub. Date: Nov. 1, 2007

(65) Prior Publication Data
US 2009/0091207 A1 Apr. 9, 2009

(30) Foreign Application Priority Data
Apr. 13, 2006 (JP) .............................. 2006-111237

(51) Int. Cl.
*H02K 11/00* (2006.01)
(52) U.S. Cl. .................. 310/128; 310/219; 310/231
(58) Field of Classification Search ......... 310/231–237, 310/128–135, 219
See application file for complete search history.

(56) References Cited

U.S. PATENT DOCUMENTS

| | | | | |
|---|---|---|---|---|
| 491,106 A | * | 2/1893 | Hicks | 310/128 |
| 1,526,613 A | * | 2/1925 | Stephenson | 388/835 |
| 1,576,615 A | * | 3/1926 | Paulero | 361/160 |
| 1,655,286 A | * | 1/1928 | Nietsche | 310/40 R |
| 2,931,927 A | * | 4/1960 | McAdam et al. | 310/67 R |
| 2,939,975 A | * | 6/1960 | Richards | 310/131 |
| 3,014,142 A | * | 12/1961 | Lee | 310/162 |
| 3,173,043 A | * | 3/1965 | Newill | 310/128 |
| 3,715,643 A | * | 2/1973 | Masaki | 318/466 |
| 5,164,623 A | * | 11/1992 | Shkondin | 310/67 R |
| 6,488,259 B1 | * | 12/2002 | Fujita et al. | 251/129.11 |
| 6,684,485 B1 | * | 2/2004 | Potocnik et al. | 29/597 |
| 7,569,959 B2 | * | 8/2009 | Kuwano et al. | 310/148 |
| 2003/0090165 A1 | | 5/2003 | Ettridge | |
| 2004/0070292 A1 | | 4/2004 | Fujita et al. | |

FOREIGN PATENT DOCUMENTS

| | | |
|---|---|---|
| EP | 1 113 569 A1 | 7/2000 |
| JP | 62-25857 A | 2/1987 |

(Continued)

*Primary Examiner*—Dang D Le
(74) *Attorney, Agent, or Firm*—Birch, Stewart, Kolasch & Birch, LLP.

(57) ABSTRACT

In a DC-motor according to the present invention, contact areas of first brushes can be enlarged without enlarging the external diameter of a disk on which a commutator is provided; therefore, the wear resistance of the first brushes can be enhanced while maintaining a good control-response; and at the same time, the axial dimension can be shortened dramatically, so that the DC-motor can be downsized. The first brushes 14 are radially in contact with the commutator 11, and second brushes 15 are axially in contact with slip rings 12 that are formed circumferentially inside the commutator 11.

6 Claims, 4 Drawing Sheets

FOREIGN PATENT DOCUMENTS

| | | |
|---|---|---|
| JP | 2000-230657 A | 8/2000 |
| JP | 2003-189547 A | 7/2003 |
| JP | 2004-328896 A | 11/2004 |
| WO | WO-01/05018 A1 | 1/2001 |
| WO | WO-01/54235 A1 | 7/2001 |
| WO | WO-03/019749 A1 | 3/2003 |

* cited by examiner

DC-MOTOR

BACKGROUND OF THE INVENTION

1. Field of the Invention

The present invention relates to a DC-motor in which a DC current supplied from a power supply is commutated by a commutator and is supplied through slip rings into magnetizing coils.

2. Description of the Related Art

Generally, the commutator of a DC-motor is split into multiple segments so as to commutate a current supplied through first brushes from a power supply.

A first type of conventional DC-motors is configured in such a manner that the first brushes are axially in contact with the commutator while second brushes are axially in contact with slip rings that are split into three pieces and circumferentially formed outside the commutator (for example, refer to Patent Document 1).

A second type of conventional DC-motors is configured in such a manner that the first brushes are radially in contact with the commutator while the second brushes are radially in contact with slip rings that are split into three pieces and formed coaxially with the commutator (for example, refer to Patent document 1).

A third type of conventional DC-motors is configured in such a manner that the first brushes are radially in contact with the commutator while the second brushes are axially in contact with slip rings that are split into three pieces and formed outside the circumference of the commutator (for example, refer to Patent Document 2).

Patent Document 1: Japanese Patent Laid-Open No. 2000-230657 (FIG. 1 and FIG. 5)

Patent Document 2: International publication No. 2001-05018 (FIG. 6)

In the first-type DC-motor, because the first brushes slide in contact with the commutator, the first brushes wear away with the lapse of time. Meanwhile, decreasing the density of a current flowing through the first brushes can reduce electrical wear of the first brushes, enhancing their wear resistance. However, in order to achieve that, it is necessary to enlarge areas through which the first brushes are in contact with the commutator. To enlarge the first brushes' contact areas with the commutator, it is also necessary to enlarge the commutator that is in contact with the first brushes, leading to a bigger outer-diameter disk on which the commutator is provided. The bigger the diameter of the disk becomes, the more increased the moment of inertia thereof and the sliding-frictional resistance working between the commutator and the first brushes are; therefore, there has been a problem in that the control-response of the DC-motor is deteriorated.

Patent Document 1 illustrates a first-type DC-motor in which the overall lengths of the first brushes and the second brushes are almost equal. However, in an actual first-type DC-motor, because the first brushes are in contact with the commutator, electrical polarities at the tips of the first brushes change frequently, resulting in their electrical wear; therefore, the first brushes are used that have an overall length longer than that of the second brushes. That is, the first brushes, having an overall length longer than that of the second brushes, are axially in contact with the commutator, resulting in a large axial dimension of the DC-motor; therefore, a problem has been that the DC-motor can not be downsized.

In the second-type DC-motor, because the first brushes are radially in contact with the commutator, the external diameter of the disk on which the commutator is provided does not need to be made larger in order to enlarge contact areas of the first brushes. Therefore, the contact areas can be enlarged while maintaining a good control-response of the DC-motor, so that the wear resistance of the first brushes can be enhanced.

However, the second brushes are radially in contact with the slip rings placed coaxially with the commutator, and the three slip rings are axially placed in a stack, which results in a large axial dimension of the DC-motor; therefore, there has been a shortcoming in that the DC-motor can not be downsized.

In the third-type DC-motor, because the first brushes are radially in contact with the commutator, the contact areas can be enlarged, similarly to the second-type DC-motor, while maintaining a good control-response of the DC-motor, so that the wear resistance of the first brushes can be enhanced as well.

However, because the commutator is annularly placed inside the slip rings, the commutator needs to be provided, protruding outwardly in an axial direction, at the center of the disk in order to be radially in contact with the first brushes, which results in a large axial dimension of the DC-motor; therefore, there has been a shortcoming in that the DC-motor can not be downsized.

SUMMARY OF THE INVENTION

The present invention is made to solve the problem described above, and aims to enlarge contact areas of the first brushes without making larger the external diameter of the disk on which the commutator is provided. That is, this invention aims to obtain a DC-motor in which the wear resistance of the first brushes can be enhanced while maintaining a good control-response, so that its axial direction can drastically be shortened, resulting in enabling its downsizing.

A DC-motor according to the present invention includes a stator with a plurality of coils disposed thereon, a rotor, having a plurality of magnetic poles, disposed opposing the inner circumferential face of the stator, and a current-carrying unit provided at one end of the stator, for commutating a current supplied from a power supply so as to supply the current into the plurality of stator coils; the current-carrying unit is configured with a disk rotating in an integrated manner with the rotor and the disk has current-carrying portions on its radial outer circumferential face and on its end face in an axial direction.

The DC-motor according to the present invention can not only enhance wear resistance of the brushes while maintaining a good control-response of the DC-motor, but also be downsized.

BRIEF DESCRIPTION OF THE DRAWINGS

FIG. 2(A) is a top view of the DC-motor and FIG. 2(B) is a side view thereof;

DESCRIPTION OF THE SYMBOLS

2: STATOR
3: STATOR CORE
4: COIL
8: ROTOR
9: PERMANENT MAGNET
10: DISK
11: COMMUTATOR
11a: COMMUTATOR SEGMENT
12: SLIP RINGS
14: FIRST BRUSHES
15: SECOND BRUSHES

BEST MODE FOR CARRYING OUT THE INVENTION

Embodiment 1

An embodiment according to the present invention will be explained below, based on the views.

Figure 1:
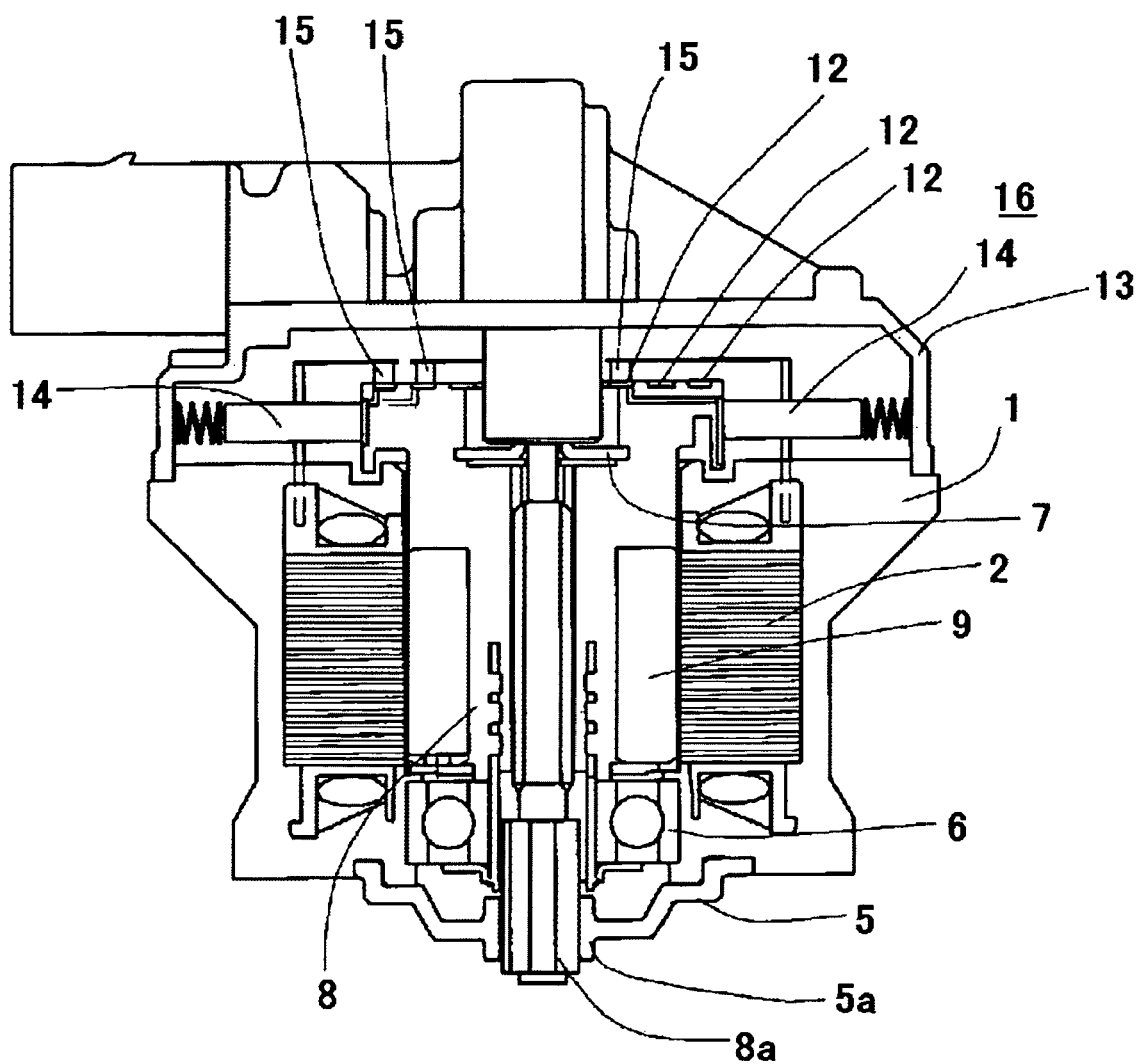
FIG. 1 is a sectional view illustrating a configuration of a DC-motor of Embodiment 1 according to the present invention.
Figure 2:
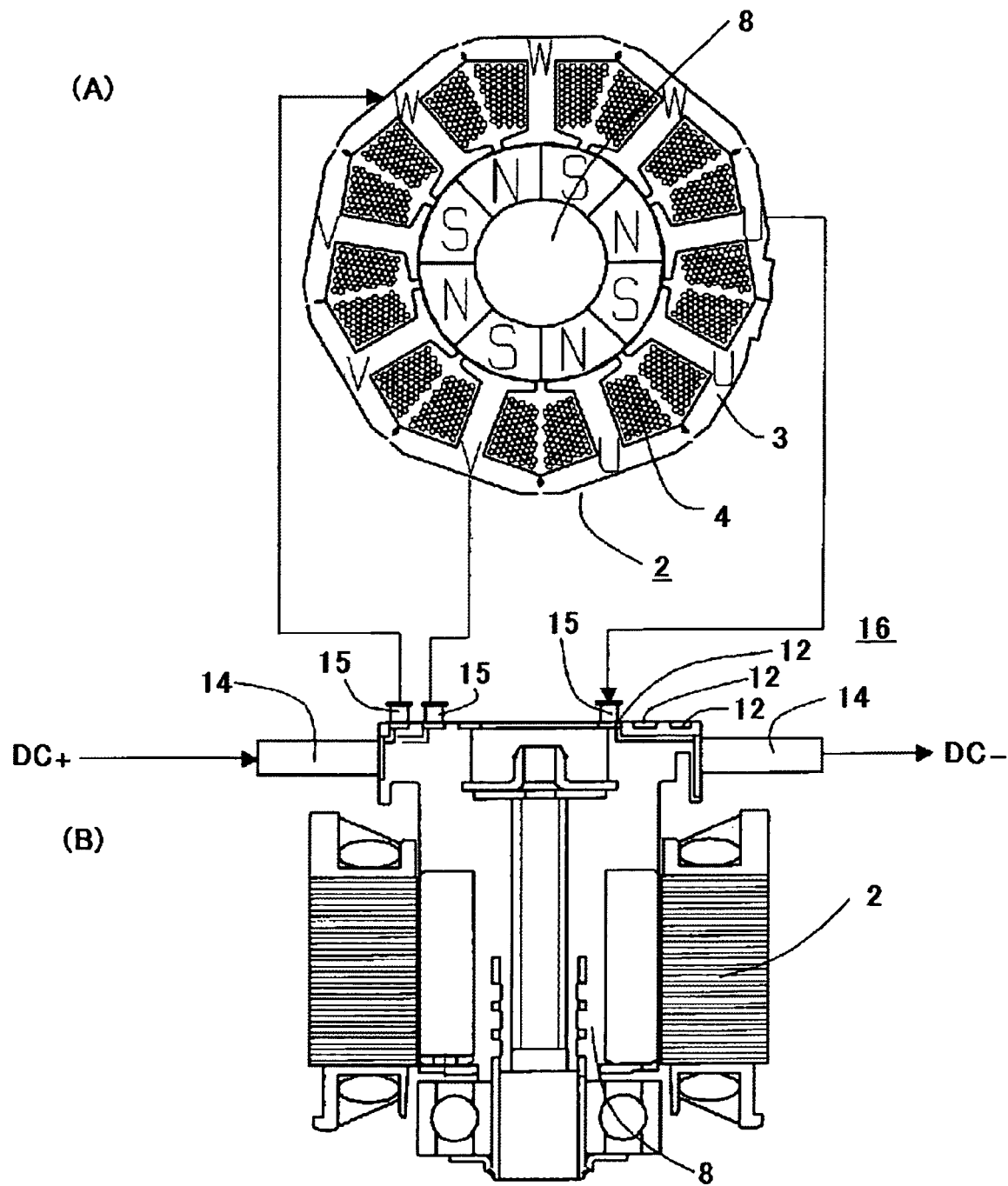
FIG. 2 illustrate current flows in a current-carrying unit of the DC motor shown in FIG. 1.
Figure 3:
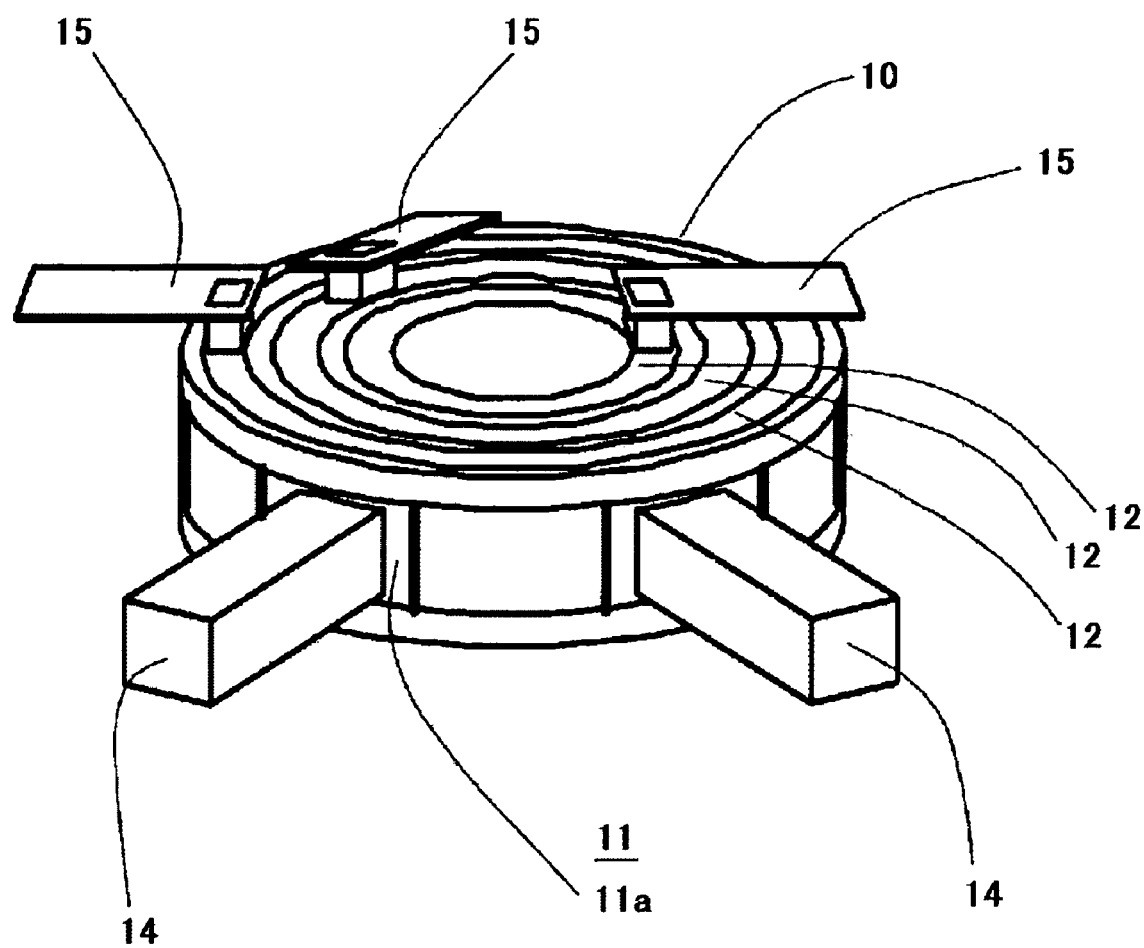
FIG. 3 is a perspective view illustrating a configuration of a commutator and slip rings of the DC-motor shown in FIG. 1.
Figure 4:
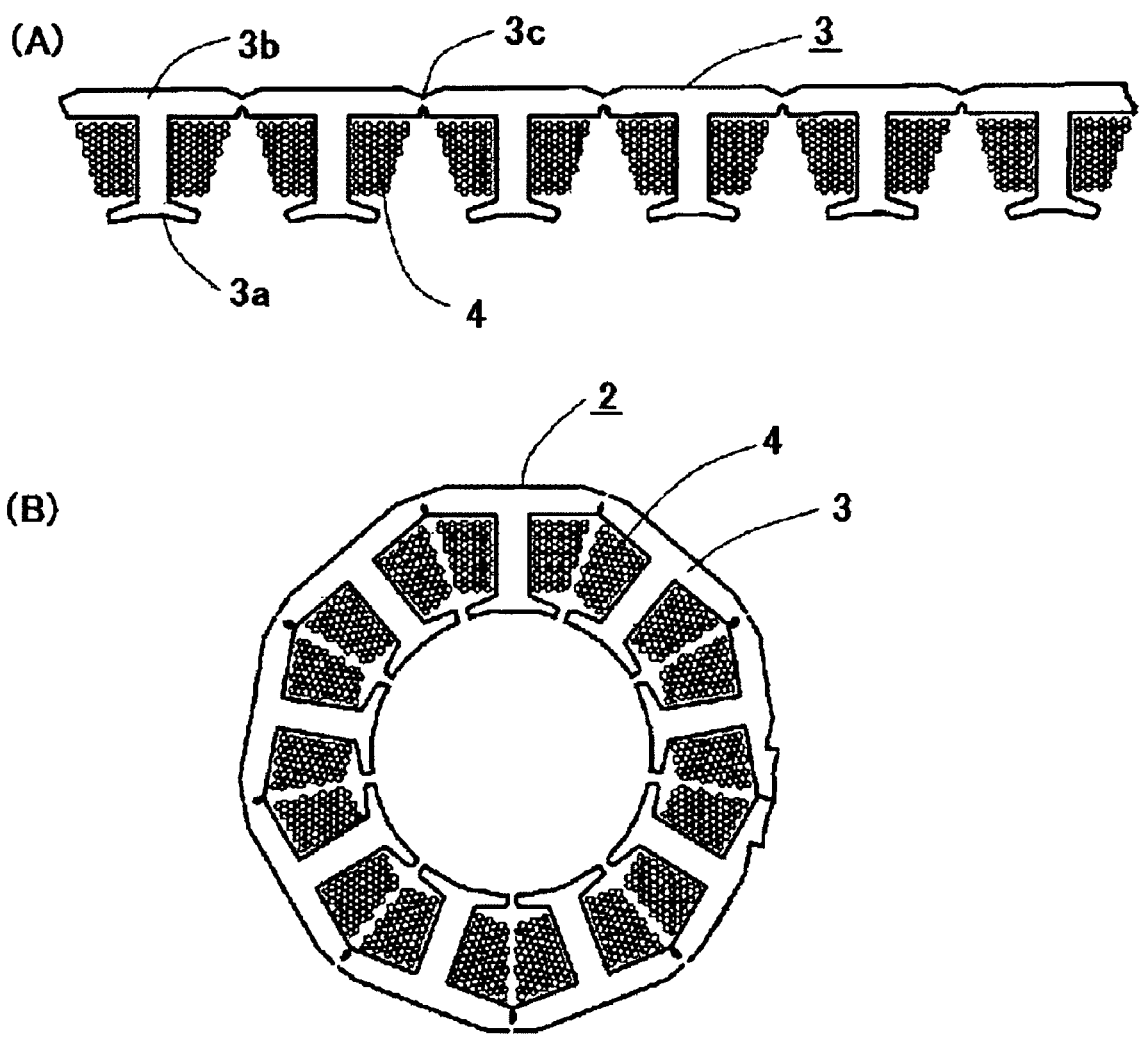
FIG. 4 are top views for explaining a method of manufacturing a stator of the DC-motor shown in FIG. 1.

FIG. 1 is a sectional view illustrating a configuration of a DC-motor of Embodiment 1 according to the present invention. FIG. 2 illustrate current flows in a current-carrying unit of the DC-motor shown in FIG. 1, and FIG. 2(A) is a top view thereof and FIG. 2(B) is a side view thereof. FIG. 3 is a perspective view illustrating configurations of a commutator and slip rings shown in FIG. 1. FIG. 4 are top views for explaining a method of manufacturing a stator shown in FIG. 1.

In FIG. 1, numeral 1 represents a motor case formed of resin material, and numeral 2 represents a stator resin-molded integrally with the motor case 1. As shown in FIG. 4(A), magnetic-pole teeth 3a are each formed on core pieces 3b to protrude therefrom. A stator core 3 is formed by laminating a predetermined number of magnetic-material plates each of which includes the core pieces 3b connected through thin-walled portions 3c. For ease of winding, a coil-winding machine (not shown in the figure) winds coils 4 around each of the magnetic teeth 3a in the state shown in the figure. Then, the stator 2 is formed into an annular shape, as shown in FIG. 4(B), by bending the thin-walled portions 3c.

Numeral 5 represents a flange member mounted at one end portion of the motor case 1, and a boss portion 5a is formed at the central portion of the flange member to protrude therefrom so that the boss portion supports a bearing 6. Numeral 7 represents a bearing placed coaxially with the bearing 6. Numeral 8 represents a rotor whose ends are supported by the bearings 6 and 7; in the outer circumferential portion of the rotor, a plurality of permanent magnet poles 9 is placed, each facing the coils 4 of the stator 2. The rotor 8 is formed in such a way that a motor shaft 8a protrudes from one rotor end supported by the bearing 6.

As shown in FIG. 3, numeral 10 represents a disk that is fixed to the other end of the rotor 8 and rotates together with the rotor 8. Numeral 11 represents a commutator formed by circumferentially splitting into multiple segments the outer circumferential face of the disk. The commutator 11 is formed so that its contact surface faces radially. Numeral 12 represent slip rings that are formed, being concentrically split into n-pieces (into three pieces, in the figure), inside the commutator 11. The slip rings 12 are formed so that their contact surfaces face axially. Numeral 13 represents a bracket mounted at the other end of the motor case 1.

Numeral 14 represents a pair of first brushes which is insulated from and supported by the bracket 13, and the tips of the first brushes each are slidably in contact with the contact surfaces of the segments of the commutator 11—commutator segments 11a—with a predetermined pressure. The first brushes 14 are radially in contact with the respective commutator segments 11a. Numeral 15 represents three second brushes which are insulated from and supported by the bracket 13, and the tips of the second brushes each are slidably in contact with the contact surfaces of the slip rings 12 with a predetermined pressure. The second brushes 15 each are axially in contact with the respective slip rings 12.

Because the first brushes 14 are in contact with the commutator segments 11a, electrical polarities at the tips of the first brushes 14 change frequently. Therefore, while mechanical wear occurs at the first brushes 14 by making contact with the commutator segments 11a, electrical wear also occurs due to frequent changes in the electrical polarities at the tips of the first brushes. On the other hand, because the electrical polarities at the tips of the second brushes 15 change less frequently than those at the tips of the first brushes 14, little electrical wear occurs at the second brushes. Therefore, because the wear amount of the first brushes 14 is larger than that of the second brushes 15, the overall lengths of the first brushes are longer than those of the second brushes 15. In addition, a current-carrying unit 16 is composed of the elements represented by numeral 10—the disk—through numeral 12—the slip rings.

Next, the operations of the DC-motor, configured as explained above, according to Embodiment 1 will be explained.

To begin with, when a DC current flows through one of the first brushes 14 from a power supply (not shown in the figure), the current is commutated by the commutator 11 to flow into the slip ring 12 and is supplied to the stator 12 through one of the second brushes 15, as illustrated in FIG. 1 through FIG. 3. After the DC current flows through the coils 4, the current flows through another second brush 15, the slip ring 12, and the commutator 11, and returns to the power supply via the other first brush 14.

Then, a rotating torque at the rotor 8 is generated by an action between magnetic fluxes generated at the coils 4 through which the current flows and the permanent magnets 9 of the rotor 8. The disk 10 also rotates by the rotating torque, so that the combinations of the first brushes 14 with the commutator segments 11a being in contact therewith are changed. Therefore, the coils 4 that the current flows into are successively switched, so that the rotor 8 begins to continuously rotate.

In the DC-motor configured in a manner described above, the first brushes 14 are radially in contact with the commutator 11, and the second brushes are axially in contact with the slip rings 12 annularly formed inside the commutator 11. Therefore, even when contact areas through which the first brushes 14 are in contact with the commutator 11 is enlarged in order to improve the wear resistance of the first brushes 14, because the commutator is placed facing radially, the disk 10 on which the commutator 11 is provided does not need to be changed in its radial size. That is, even though the area through which the first brushes 14 are in contact with the commutator 11 is enlarged, the inertia of moment is not increased and the sliding-frictional resistance between the commutator 11 and the first brushes 14 is not increased; therefore, the wear resistance of the first brushes can be enhanced while a good control-response of the DC-motor is maintained.

When the DC-motor according to the present invention is compared with the conventional first-type DC-motor, the first brushes 14, having their overall length longer than that of the second brushes 15, are radially in contact with the commutator; therefore, the overall length in the axial direction can be shortened by the difference between the overall length of the first brushes 14 and that of the second brushes 15; that is, the dimension of the DC-motor in its axial direction can be shortened than that of the first-type DC-motor, enabling the DC-motor to be downsized.

When the DC-motor according to the present invention is compared with the conventional second-type DC-motor, the second brushes 15 are axially in contact with the slip rings 12, so that the slip rings 12 can be placed on the same plane. Therefore, the slip rings do not need to be placed in a manner of the second type DC-motor—in which the three slip rings 12 are axially placed in a stack on the commutator 11, so that the axial dimension of the DC-motor can be made shorter to downsize the DC-motor.

When the DC-motor according to the present invention is compared with the conventional third-type DC-motor, the commutator 11 is placed circumferentially outside the slip rings 12; therefore, in order to make the first brushes 14 radially contact with the commutator 11, the commutator does not need to be formed in a manner in which the commutator 11 of the third-type DC-motor is formed to axially protrude; consequently, the DC-motor according to the present invention can have a shorter dimension in axial direction to be downsized.

That is to say, while maintaining a good control-response, the DC-motor according to Embodiment 1 can not only have first brushes 14 with an improved wear resistance, but also can be downsized.

In addition, although a configurational relationship between the rotor 8 and the current-carrying unit 16 has not been described in detail, the rotor 8 and the current-carrying unit 16 may be integrally molded of resin.

When the rotor 8 and the current-carrying unit 16 are integrally molded, the strength between the rotor 8 and the current-carrying unit 16 is improved by integrally molding. Therefore, when the side face of the current-carrying unit 16 with which the first brushes 14 are in contact is superficially cut in order to improve their coaxial rotation with the shaft, the face can be superficially cut without separation between the rotor 8 and the current-carrying unit 16 due to an insufficient strength between them.

In addition, the integral resin-molding of the rotor 8 and the current-carrying unit 16 can reduce assembling steps, comparing with those when assembling discrete members, which also leads to low costs.

Furthermore, it is more advantageous to use thermoplastic resin as the resin described above. Generally, thermoplastic resin gives productivity higher than thermosetting one; therefore, in order to mass-produce DC-motors and such, the thermoplastic resin is preferable to the thermosetting one.

In the DC-motor according to the present invention, the first brushes 14 are radially in contact with the commutator 11, and the second brushes 15 are axially in contact with the slip rings 12 that are formed circumferentially inside the commutator 11. Therefore, when enlarging the areas through which the first brushes 14 are in contact with the commutator 11, because the commutator 11 is placed facing radially, the contact areas can be enlarged without enlarging the external diameter of the disk 11. That is, the contact areas can be enlarged while a control-response of the DC-motor can be maintained favorably.

Enlarging contact areas through which the first brushes 14 are in contact with the commutator 11 can reduce the density of the current flowing through the first brushes 14; therefore, the sparks generated between the first brushes 14 and the commutator 11 can be reduced. That is, the heat generated between the first brushes 14 and the commutator 11 can be reduced.

According to the DC-motor of the present invention, the rotor 8 is configured with the permanent-magnet poles 9, instead of coils 4; therefore, its manufacturing process does not need welding operations and such, so that no heat is generated by welding. Then, the forming can be performed using as resin thermoplastic one. By using as resin thermoplastic one, the productivity of the DC-motors can be improved.

The DC-motor according to the present invention is suitable for being used especially in an exhaust-gas-recirculation device in which part of exhaust gas is re-circulated into the intake system of automobile engines, so as to produce less inert-gas and achieve a good fuel-consumption-rate as well.

An exhaust-gas-recirculation device drives directly and axially a valve member (not shown in the figure) that opens/blocks a passage between an exhaust passage (not shown in the figure) and an intake passage (not shown in the figure) so as to re-circulate part of exhaust gas into the intake passage, so that a good fuel-consumption rate can be achieved. In the exhaust-gas-recirculation device, the DC-motor according to the present invention is used in order to drive directly and axially the valve member.

More specifically, a rotating torque generated at the rotor 8 of the DC-motor according to the present invention is converted into a direct driving force which makes the motor shaft 8a shift axially. Then, the direct driving force shifts a valve member (not shown in the figure) that opens/blocks the passage between the exhaust passage and the intake passage.

The exhaust-gas-recirculation device is installed in an engine compartment of an automobile. In recent years, automobile engines have been downsized and enhanced in their performances; and automobile manufacturers demand that downsizing of the exhaust-gas-recirculation device be accomplished. Because of restrictions in installing automobile-engine components, automobile manufactures often demand that downsizing of the exhaust-gas-recirculation device, especially in its axial direction, be achieved.

In the DC-motor according to the present invention, the first brushes 14 are radially in contact with the slip rings 11, so that the axial dimension of the DC-motor can be shortened in order to downsize the DC-motor.

In addition, because the exhaust-gas-recirculation device is aimed to achieve a good fuel-consumption rate, it is required to have a good control-responsiveness. In the DC-motor according to the present invention, the external diameter of the disk 10 is not increased even when areas through which the first brushes 14 are in contact with the commutator 11 is enlarged. Therefore, because the inertia of moment is not increased and the sliding-frictional resistance between the commutator 11 and the first brushes 14 is not increased, the DC-motor can be controlled in good response.

That is, in the DC-motor according to the present invention, it is possible to axially downsize the DC-motor while maintaining a good control-response thereof; therefore, the DC-motor is suited for exhaust-gas-circulation devices of automobiles.

What is claimed is

1. A DC-motor comprising:
   a stator with a plurality of coils disposed thereon, a rotor, having a plurality of magnetic poles, disposed opposing the inner circumferential face of the stator, and a current-carrying unit provided at one end of the stator, for commutating a current supplied from a power supply so as to supply the current into the plurality of stator coils; wherein the current-carrying unit includes a disk rotating in an integrated manner with the rotor and the disk has a current-carrying portion on its radial outer circumferential face and a current-carrying portion on its end face in an axial direction, and the current-carrying portion provided on the radial outer circumferential face is a commutator.

2. A DC-motor according to claim 1, wherein the current-carrying portion provided on the radial outer circumferential face is a commutator circumferentially split into multiple segments and the current-carrying portion provided on the end face in the axial direction is slip rings split for n-number phases.

3. A DC-motor according to claim 2, wherein the commutator commutates a current supplied through a first brush and the slip rings supply into the stator coils through a second brush the current commutated into the n-number phases by the commutator.

4. A DC-motor according to any one of claim 1 through claim 3, wherein the DC-motor is used for an exhaust-gas-recirculation device.

5. A DC-motor according to any one of claim 1 through claim 3, wherein the rotor and the current-carrying unit are integrally molded of resin.

6. A DC-motor according to claim 5, wherein the resin is thermoplastic.

* * * * *